United States Patent
Barreto et al.

(10) Patent No.: US 12,164,951 B2
(45) Date of Patent: Dec. 10, 2024

(54) SYSTEMS AND METHODS FOR PROVIDING VIRTUAL SYSTEM ON CHIP (vSoC) INSTANCES

(71) Applicant: Battelle Memorial Institute, Columbus, OH (US)

(72) Inventors: Giancarlo Canales Barreto, Dayton, OH (US); Nicholas L. Lamb, Upper Arlington, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 18/548,770

(22) PCT Filed: Mar. 3, 2022

(86) PCT No.: PCT/US2022/018624
§ 371 (c)(1),
(2) Date: Sep. 1, 2023

(87) PCT Pub. No.: WO2022/187432
PCT Pub. Date: Sep. 9, 2022

(65) Prior Publication Data
US 2024/0143383 A1    May 2, 2024

Related U.S. Application Data

(60) Provisional application No. 63/156,324, filed on Mar. 3, 2021.

(51) Int. Cl.
*G06F 9/455* (2018.01)

(52) U.S. Cl.
CPC ............. *G06F 9/45558* (2013.01); *G06F 2009/45562* (2013.01)

(58) Field of Classification Search
CPC ............. G06F 9/45558; G06F 2009/45562
See application file for complete search history.

(56) References Cited

U.S. PATENT DOCUMENTS

| | | |
|---|---|---|
| 2009/0228684 A1 | 9/2009 | Ramesh et al. |
| 2010/0325278 A1 | 12/2010 | Heim et al. |
| 2011/0271277 A1* | 11/2011 | Hussain ............... G06F 3/0683 718/1 |
| 2011/0296412 A1 | 12/2011 | Banga et al. |
| 2013/0091498 A1 | 4/2013 | Arcese et al. |
| 2014/0380028 A1 | 12/2014 | Cheng et al. |
| 2015/0339144 A1 | 11/2015 | Cao |
| 2017/0308408 A1* | 10/2017 | Goyal ................... G06F 9/5077 |
| 2019/0146821 A1* | 5/2019 | Berner ................ G05B 19/042 718/1 |

OTHER PUBLICATIONS

International Search Report and Written Opinion of International Application No. PCT/US2022/018624, mail date Jun. 29, 2022, 13 pages.

* cited by examiner

*Primary Examiner* — Jacob D Dascomb
(74) *Attorney, Agent, or Firm* — Grossman, Tucker, Perreault & Pfleger, PLLC; Donald G. Weiss

(57) ABSTRACT

In an approach to providing virtualized hardware resources, one or more reconfigurable hardware devices (RHDs) are configured to instantiate a first virtual System-on-Chip (vSoC) instance of one or more vSoC instances, the first vSoC instance implementing at least one virtualized system component.

22 Claims, 6 Drawing Sheets

SYSTEMS AND METHODS FOR PROVIDING VIRTUAL SYSTEM ON CHIP (vSoC) INSTANCES

CROSS-REFERENCE TO RELATED APPLICATIONS

This is the U.S. National Phase Application under 35 U.S.C. § 371 of International Patent Application No. PCT/US2022/018624 filed Mar. 3, 2022, which claims the benefit of U.S. Provisional Application Ser. No. 63/156,324, filed Mar. 3, 2021, the entire teachings of which application is hereby incorporated herein by reference.

TECHNICAL FIELD

The following disclosure relates generally to virtualized hardware resources, and specifically to systems and methods for providing virtual system on chip (vSoC) instances.

BACKGROUND

Hardware-assisted virtualization and para-virtualization have become an important aspect of modern computing systems. A host computer, e.g., the computer system providing the underlying physical hardware, can provide any number of virtual machines. Such virtual machines can provide different operating systems and hardware peripherals (e.g., network interfaces) relative to the host computer, with compatibility being resolved by software-implemented hardware abstraction layers, for example. The software that creates a virtual machine on the host computer is generally called a hypervisor.

However, host systems that feature hypervisor capabilities include a number of draw backs. Main processors and other hardware resources are physically permanent, which is to say they cannot adapt or otherwise change their physical characteristics due to their fixed circuitry. Main processors and other hardware resources can include weaknesses that, when identified by malicious actors, create vulnerabilities. Such hardware weaknesses may not be "patchable" or otherwise correctable without a full replacement. In addition, main processors and supporting components (e.g., memory, disk drives, graphic processing units) can experience performance degradation through hardware bugs and degradation caused by component aging and manufacturing defects.

Also, main processors and other associated hardware resources have physical performance limitations in the context of virtualization since they are tuned for general purpose computing. Some main processors include extensions to increase virtualization performance, but such extensions tend to be limited in functionality. Some host computers implement virtualization technologies (including spoofed 'hardware' presented to their guests) entirely in software (e.g., without the use of processor extensions) which is significantly slower than hardware and can also be more susceptible to attacks through flaws in either hardware or software.

There exists a need to provide hardware abstractions of computer resources and components that increases performance of virtualized hardware component while minimizing or otherwise reducing the potential for un-patchable hardware flaws to create exploitable vulnerabilities.

SUMMARY

In one illustrative embodiment, a system for providing virtualized hardware resources comprises one or more reconfigurable hardware devices (RHDs) configured to instantiate a first virtual System-on-Chip (vSoC) instance of one or more vSoC instances, the first vSoC instance implementing at least one virtualized system component.

In another illustrative embodiment, execution is initiated by a controller of a first virtual system-on-chip (vSoC) instance of one or more vSoC instances on a first RHD, the first vSoC instance having at least one virtualized system component. Execution is initiate by the controller of a second vSoC instance of the one or more vSoC instances on the first RHD, the second vSoC instance having at least one virtualized system component, wherein the first vSoC instance and second vSoC instances are concurrently executed on the first RHD.

In yet another illustrative embodiment, an apparatus for providing virtualized hardware resources comprises: an underlying physical hardware; one or more reconfigurable hardware devices (RHDs), wherein the one or more RHDs are implemented in the underlying physical hardware; an orchestrator, where the orchestrator is configured to initiate virtualization and/or de-virtualization of one or more virtual System-on-Chip (vSoC) instances; and the one or more vSoC instances, where each vSoC instance of the one or more vSoC instances has at least one virtualized system component.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings.

DETAILED DESCRIPTION

Figure 1:
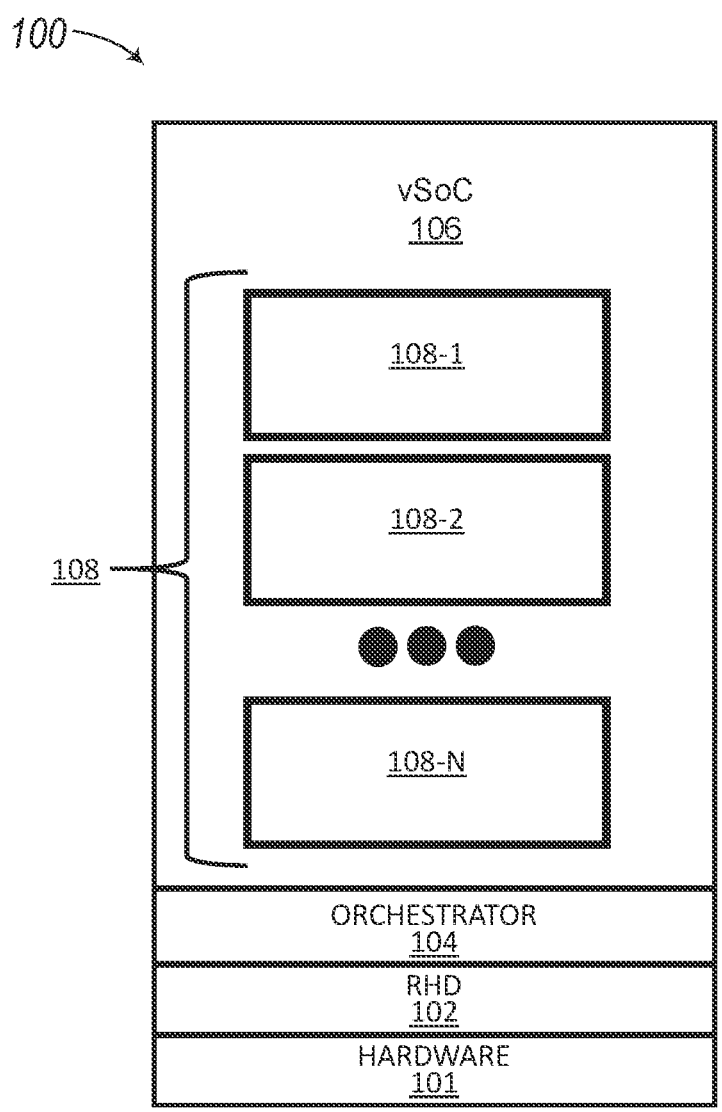
FIG. 1 depicts an example system for providing a virtual System-on-Chip (vSoC) instance consistent with aspects of the present disclosure.

System-on-Chip (SoC) architectures have become increasingly popular over conventional motherboard-based computer systems, particularly in scenarios such as virtualization that aims to increase performance while reducing power consumption. Conventional motherboard-based computer systems generally include a number of different components such a central processor unit (CPU), a memory and graphic processing unit (GPU) which are interconnected via a data bus. Often these components are separate and detachable from the motherboard to allow for upgradability and hardware replacements, for example.

In contrast, SoC architecture includes an integrated circuit or "chip" which integrates all or most components of a computer into a single integrated circuit. For example, an SoC generally integrates a CPU along with one or more additional devices such as a GPU, read-only memory, random access memory (RAM), and potentially proprietary blocks such as cryptographic cores. Thus, an SoC may contain a number of components that can perform digital, analog, mix-signal, and in some instances radio frequency (RF) signal processing functions. However, these SoC hardware resources are also typically implemented as fixed components, e.g., structures within silicon, and can also be susceptible to the performance impacts related to hardware bugs and failures which can occur over time.

The present disclosure has identified that next generation systems engineering practices in space, automotive and industrial systems will shift towards the use of virtualized execution environments in order to reduce cost and complexity while increasing security and performance.

In view of the foregoing, the present disclosure includes systems and methods generally directed to implementing one or more SoC instances within reconfigurable hardware to accelerate virtualized system components and securely isolate virtualized system components [i.e., eliminate shared hardware resources]. Such SoC instances may be generally referred to herein as virtual SoC (vSoC) instances and can provide a meta-virtualization approach to virtualized resource allocation and management. This is in contrast to existing virtualization approaches that use hardware-assisted virtualization and para-virtualization, which generally includes software to emulate virtualized system components. In addition, implementing vSoC instances provide the benefit of a non-static, and thus deterministically fixed hardware environment. In this way users can update their hardware to take advantage of new features or completely change the architecture to a different one without having to remanufacture the device.

Preferably, vSoC instances consistent with the present disclosure are implemented within one or more reconfigurable hardware devices (RHDs). Some such example RHDs may be implemented using programmable logic devices (PLDs). The PLDs may include field programmable gate arrays (FPGAs), which may be optimized for performance-per-watt, e.g., one or more Xilinx Artix®-7 or comparable 28-nm node technology FPGA devices. Other RHD device architectures are within the scope of this disclosure, and it should also be noted that various aspects and features of the present disclosure can be implemented in other devices or hardware that are not necessarily reprogrammable such as application-specific integrated circuits (ASICs). For example, an orchestrator consistent with the present disclosure may be implemented whole, or in part, within such non-programmable hardware.

In the context of FPGAs, vSoC instances consistent with the present disclosure are preferably implemented within the reprogrammable fabric of an FPGA, e.g., within the programmable portion that may include lookup tables (LUTs) and associated interconnect fabric. Thus, vSoC instances consistent with the present disclosure can be implemented as soft cores rather than a hard-core element, e.g., a structure implemented within silicon.

The vSoC approach of the present disclosure represents a paradigm shift in the context of virtualization of system components. Aspects of the present disclosure incorporate reconfigurable hardware to implement and virtualize all or a portion of the resources available in existing SoCs. The vSoC approach of the present disclosure can be applied to a wide variety of applications including space, bio-medical, automotive, mobile platforms, industrial automation, military, Internet of Things (IoT), cloud infrastructure, datacenters, and other business sectors.

Some specific, non-limiting example benefits of the vSoC approach of the present disclosure include the ability to provide acceleration of virtualized system components without necessarily relying on a main CPU implementing virtualization extensions. A system implementing one or more vSoCs consistent with the present disclosure can virtualize digital circuitry and software, for example, to achieve performance similar to that of dedicated hardware. A system implementing one or more vSoCs consistent with the present disclosure can implement multiple vSoC instances within a single RHD, clone vSoC instances on the same or different RHDs, and/or transfer vSoC instances between RHDs for numerous purposes such as dynamic scaling, reconfiguration, etcetera. Stated differently, the present disclosure provides a meta-virtualization approach that achieves performance comparable to hardware devices and dynamic reconfiguration of virtualized resources.

A vSoC instance of the present disclosure can be implemented without being tied to specific underlying physical hardware to avoid vendor lock-in and the potential for hardware to become obsolete and unsupported. Stated differently, an aim of the present disclosure is to provide vSoC instances in a hardware-agnostic manner that avoids dependence on a particular underlying hardware architecture. Furthermore, hardware vulnerabilities within a vSoC instance can be remedied through instantiating a replacement vSoC instance rather than replacement of physical hardware. The vSoC instances are preferably isolated from each other, e.g., do not share memory or fabric resources, to provide partitioning and support for multi-tenant (or multi-domain) implementations. This is particularly well suited for cloud-based implementations where each vSoC instance on a given RHD is owned and controlled by different entities. Still further, an orchestrator component consistent with the present disclosure can be implemented to monitor vSoC instances for security and diagnostic purposes.

A system implementing one or more vSoC instances consistent with the present disclosure can further virtualize hardware primitives for application-specific components to allow virtual machines or components to execute tasks as if run in dedicated hardware. Micro-architectural optimizations such as reconfiguring the Arithmetic Logic Unit (ALU) for specific computations and mathematical operations, reconfiguring cache and register hierarchy to match data, and reconfiguring memory controllers to process data can be applied to a virtual machine. These optimizations can further boost performance of the virtual machine.

Further, aspects and features of the present disclosure can be used to reduce the cost and complexity of existing systems that feature a distributed network of microelectronic components. All or a number of these components, such as CPUs, GPUs, network interfaces, and signal processing circuitry can be seamlessly virtualized within a vSoC instance consistent with the present disclosure.

Still further, aspects and features of the present disclosure enable continued development of sophisticated machine learning and deep learning algorithms that can be implemented inside, for instance, the reconfigurable fabric of an FPGA to provide a deep level of introspection. For example, a hypervisor can provide in-band or out-of-band debugging and analysis (e.g., introspection) access at a level not available in existing systems. Specifically, the Joint Test Action Group (JTAG) programming and debugging work at the FPGA or hardware device layer. Aspects and features herein provide vSoC implementations that allow for, among other things, higher speed programming and debugging of guest vSoC hardware components. Moreover, a vSoC implementation consistent with the present disclosure can provide, but does not require, self-debugging, which is the concept of debugging or otherwise introspecting a target vSoC instance without requiring external hardware or systems.

The vSoC approach of the present disclosure thus can minimize or otherwise reduce all of above-referenced drawbacks of existing virtualization approaches by improving security and hardware reliability, improving performance, and providing guest isolation through vSoC partitioning and performance enhancements achieved via reconfigurable hardware primitives. In addition, the vSoC approach of the present disclosure enables meta-virtualization of designs to allow for the physical updating of the actual hardware deployed in the system. That is, the underlying hardware can change over time without the necessity of refabrication, and vSoCs deployed in this manner can be patched when needed and instantiations of virtualized system components can operate at substantially native hardware speeds.

In one illustrative embodiment, the vSoC includes an orchestrator that is at least partially provisioned within the reprogrammable fabric of the RHD. The orchestrator can be configured to cause the dynamic provisioning and/or de-provisioning of vSoC instances consistent with the present disclosure. The orchestrator can be further configured to manage and supervise each RHD-deployed virtual environment. In one example, the orchestrator is configured to cause the association and/or de-association of vSoC instances to create, modify, and/or remove RHD-deployed virtual environments. More preferably, the orchestrator is further configured to manage a state of the RHD-deployed virtual environments and may be configured to transition the same between power-off and power-on states at a system level, e.g., for all vSoC instances associated with a given RHD-deployed virtual environment, and/or at a component/hardware instance level.

The orchestrator allows for hardware instances to be dynamically provisioned and de-provisioned to correct for abnormal behavior or conditions such as component failure through remedial action as well as for in-place upgrade of virtual components to a new version. It should be noted that the in-place upgrade of the virtual components may include adding new features to the virtual components. Some remedial actions may include provisioning replacement hardware instances to replace faulty hardware instances, and/or faulty physical hardware devices that are not necessarily implemented in a vSoC, or to replace a vSoC with a different virtual component. In some cases, the remedial action can occur in a so-called "hot swap" manner whereby a replacement vSoC instance can be provisioned and used to replace a faulty vSoC instance or physical hardware device. In one example, this includes rerouting a virtual communication channel to a replacement vSoC instance such that a physical hardware device can communicate with the replacement vSoC instance without necessarily detecting that the change occurred. In other cases, the remedial action such as a cold swap can occur and the associated RHD-deployed virtual environment can be reset or rebooted to resume operation with the replacement vSoC instance.

For example, an orchestrator consistent with the present disclosure can detect erroneous guest activity. The orchestrator can provide a monitoring system that can observe second order effects (e.g., performance counters) associated with the RHD-deployed virtual environment, and more particularly the vSoC instances that provide an equivalent of physical hardware devices within the RHD-deployed virtual environment such as a main central processing unit (CPU), peripherals, and/or supporting devices and circuitry (e.g., memory, graphics processing unit, etc.). The orchestrator may then detect abnormal patterns based on such observed second order effects. When these second-order effects are captured and processed by the orchestrator, the orchestrator can distinguish normal patterns from abnormal patterns using, for instance, machine learning, heuristics, and/or other suitable approaches. In the event of a detected abnormality, the orchestrator can cause remedial actions to occur such as such as periodically rescheduling the guest process(es) to nullify the timing results, inject faulty timing values to throw off the analysis upon which attacks are based, suspend the offending guest for forensics analysis, and/or take other actions.

An orchestrator consistent with the present disclosure can swap, migrate, and/or duplicate vSoC instances within an RHD. The orchestrator may also swap, migrate, and/or duplicate vSoC instances between a plurality of RHDs. This enables numerous benefits such as re-tasking RHDs to adapt a platform for updated mission needs. For example, a satellite may switch its primary function from image collection to image rendering. In such a scenario a vSoC may be copied any number of reasonable times to other partitions within the originating RHD and/or to other RHDs within the platform. In addition, the orchestrator may swap or migrate vSoCs to adapt to platform issues. For instance, a vehicle may hit rough terrain that causes physical damage to part or all of one RHD within the platform. In such a scenario the vSoC instance(s) lost due to physical damage can be reprovisioned to other RHD(s) within the platform. External components wired into the platform can be processed by the alternate RHD(s). This allows for extended system functionality by eliminating single points of failure.

FIG. 1 shows an example system 100 for providing at least one vSoC instance consistent with aspects of the present disclosure. FIG. 1, however, provides only an illustration of one implementation and does not imply any limitations with regard to the environments in which different embodiments may be implemented. Many modifications to the depicted environment may be made by those skilled in the art without departing from the scope of the disclosure as recited by the claims.

The example system 100 comprises hardware 101, at least one RHD 102, and an orchestrator 104. The hardware 101 can be implemented as a computer server having a central processing unit (CPU), memory, and supporting devices such as one or more hard drives, and network interface circuit(s). The hardware 101 can also be implemented without a main CPU and thus utilize a vSoC instance consistent with the present disclosure to drive the initialization and utilization of the remaining hardware components. In one preferred example, a vSoC implements one or more soft processors for use as a main CPU for the hardware 101. However, other examples include a vSoC that provides a processor for use as a main CPU using hard-CPUs provided via an RHD. In another embodiment, the hardware 101 can be implemented with a HPU, as discussed above, instead of a main CPU, whereby the HPU and a vSoC instance can coordinate activities for isolating system resources.

The at least one RHD 102 further preferably provides the orchestrator 104. The function of an orchestrator, e.g., orchestrator 104, is described in more detail above. The orchestrator 104 may be implemented via programmable fabric of the at least one RHD 102. Alternatively, or in addition, the orchestrator 104 may be implemented within non-programmable portions of the RHD 102, for example within read-only firmware storage and/or an associated hard-core processor.

The orchestrator 104 may be implemented, for example, through a hardware description language (HDL), e.g., Verilog, which may then be used to generate a bitstream for the RHD via one or more toolchains. The bitstream may then be applied to the at least one RHD 102 to cause instantiation of the orchestrator 104. One example available toolchain for generating the bitstream for the orchestrator 104 from HDL is the open-source SymbiFlow project.

The orchestrator 104 is preferably configured to initiate virtualization and/or de-virtualization to launch or suspend vSoC instances, respectively, within the at least one RHD 102. In the preferred example of FIG. 1, this includes a single vSoC instance 106. However, the orchestrator 104 can also be configured to manage a plurality of vSoC instances, as discussed further below.

The orchestrator 104 is further preferably configured to receive commands from a remote computing device (not shown), e.g., via a wide area network such as the Internet, to initiate virtualization and/or de-virtualization of vSoC instances.

Note, the orchestrator 104 may also be configured to initiate virtualization and/or de-virtualization of vSoCs consistent with the present disclosure across a plurality of RHDs. The RHDs may be collocated in the same hardware (see e.g., FIGS. 4 and 5) and/or distributed in a plurality of networked hardware, e.g., a plurality of networked computer systems. In some cases, the orchestrator 104 may be collectively implemented across a plurality of RHDs and configured to provide the plurality of RHDs as effectively a single RHD for purposes of scale. In this example, the orchestrator 104 is then able to initiate virtualization or de-virtualization of vSoCs on any one of the plurality of RHDs, transfer vSoCs between RHDs, clone vSoCs on the same or different RHDs, monitor for malicious operations and/or activities, recover a vSoC instance from a hardware failure, reconfigure different peripherals (e.g., Ethernet controller, Controller Area Network (CAN) bus, etc.), and/or provide access controls. More preferably, the orchestrator 104 performs such operations using vSoC templates as discussed further below.

As further shown, the system 100 implements at least one virtualized system component. For example, the vSoC instance 106 preferably includes a plurality of virtualized system components shown collectively at 108 and individually as 108-1 to 108-N.

As generally referred to herein, the term virtualized system component refers to a hardware component which has been programmed as a soft-core device within programmable fabric of an RHD. Some such example virtualized system components include a single core processor, a multi-core processor, a cryptographic core, a network interface circuit (NIC), a signal processing circuit, and/or an application-specific circuit. In addition, virtualized system components can include software and firmware, which can be virtualized, for example, by execution in a virtual soft-CPU that is provisioned within a vSoC instance.

Figure 2:
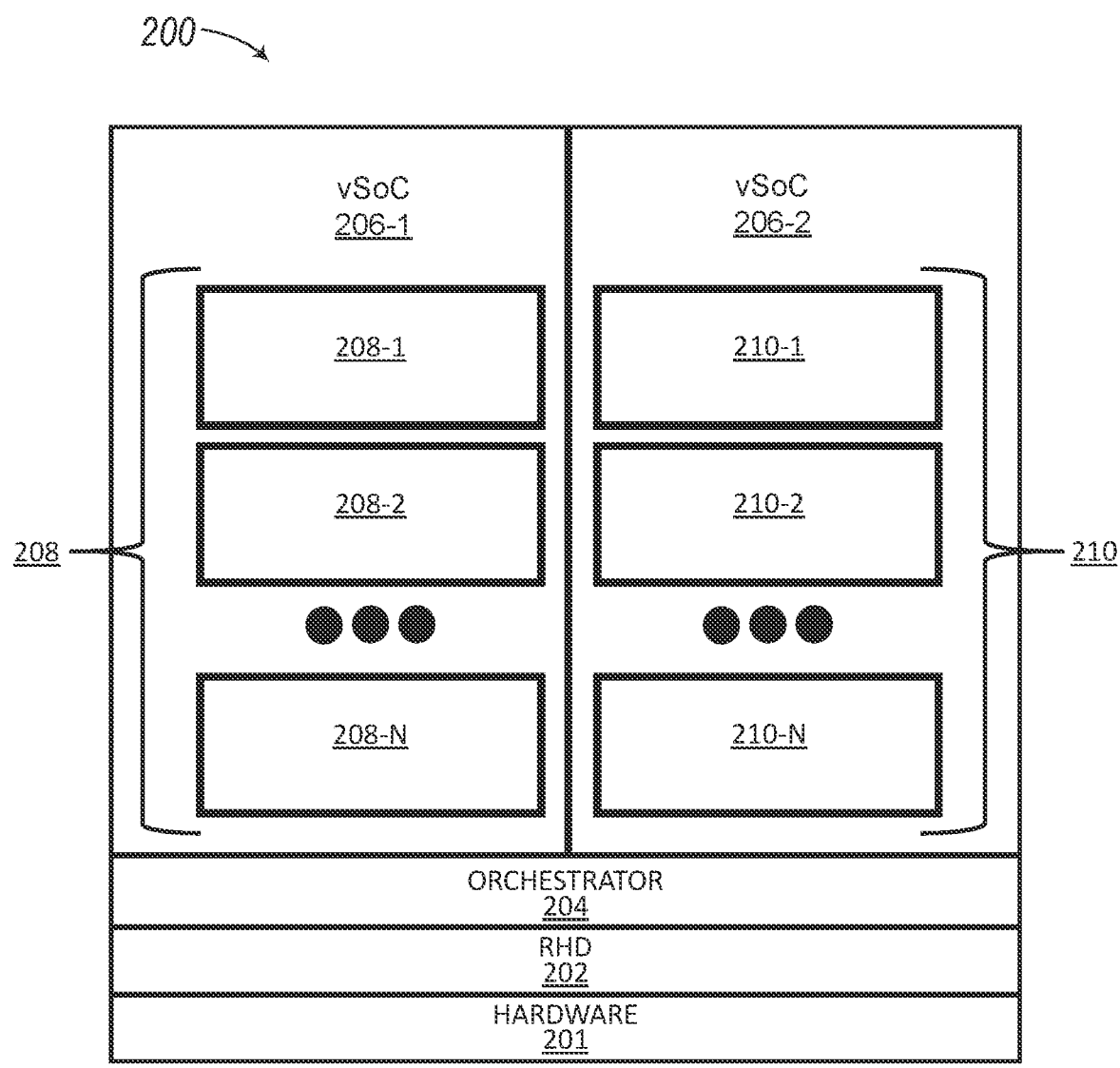
FIG. 2 depicts another example system for providing a plurality of vSoC instances consistent with aspects of the present disclosure.

Turning to FIG. 2, a block diagram of another example system 200 is shown consistent with aspects of the present disclosure. The example system 200 may be configured substantially similar to the example system 100 of FIG. 1 discussed above, the features of which are equally applicable to the example system 200 and will not be repeated for brevity. However, in the example system 200 of FIG. 2, the RHD 202 implements a plurality of vSoC instances including a first vSoC instance 206-1 and a second vSoC instance 206-2. The vSoCs may also be implemented via HDL and a toolchain to generate a corresponding bitstream, for example. The hardware 201 can be implemented substantially similar to that of hardware 101 (FIG. 1).

Preferably, each vSoC instance implemented within the RHD 202 is isolated from other vSoCs such that memory associated with the first vSoC instance 206-1 cannot be accessed by the second vSoC instance 206-2, and memory associated with the second vSoC instance 206-2 cannot be accessed by the first vSoC instance 206-1.

As further shown, each vSoC of the system 200 implements at least one virtualized system component via the vSoC instances. For example, the first vSoC instance 206-1 includes a plurality of virtualized system components shown collectively at 208 and individually as 208-1 to 208-N. Likewise, the second vSoC instance 206-2 includes a plurality of virtualized system components shown collectively at 210 and shown individually as 210-1 to 210-N.

Each vSoC of the system 200 can implement a different number of virtualized system components. For example, the first vSoC instance 206-1 can implement fewer virtualized system components than that of the second vSoC instance 206-2. In one example configuration, the first virtualized system component 208-1 of the first vSoC instance 206-1 comprises a processor such as an x84, x64, or ARM® processor, and the second virtualized system component 208-2 comprises a graphic processing unit (GPU). The first virtualized system component 208-1 can then operate as the main CPU for the first vSoC instance 206-1. In this example, the first vSoC instance 206-1 can also include further virtualized system components such as an Ethernet controller.

Continuing the above configuration, the first virtualized system component 210-1 of the second vSoC instance 206-2 may comprise a processor such as an x84, x64, or ARM® processor, and the second virtualized system component 210-2 may comprise a cryptographic core. The first virtualized system component 210-1 may then operate as the main CPU for the second vSoC instance 206-2. In this example, the second vSoC instance 206-2 can also include further virtualized system components such as an Ethernet controller.

Thus, the first vSoC instance 206-1 may include a virtualized processor as a main CPU that implements a different processor architecture and/or feature a different number of processor cores than the virtualized processor operating as the main CPU in the second vSoC instance 206-2. Note, the first vSoC instance 206-1 and the second vSoC instance 206-2 can also be configured to implement identical virtualized system components.

In one preferred example, each vSoC instance of the system 200 is implemented based on a vSoC template. The vSoC template may be contained in a human-readable file format, e.g., JavaScript Object Notation (JSON). The vSoC template defines each target virtualized system component to be instantiated and various operational parameters for the vSoC such as a selected interconnect device for communication between virtualized system components, e.g., a Peripheral Component Interconnect express (PCIe) bus. A vSoC orchestrator can detect and automatically handle various requirements requested by clients such as needs for CPU extensions for vector processing, optimized or tailored cryptographic functions, memory isolation, security lockdowns, communication processors (e.g., Controller Area Network (CAN bus), Universal Serial Bus (USB), Inter-Integrated Circuit (I2C) bus, Serial Peripheral Interface (SPI), Universal Asynchronous Receiver/Transmitter (UART), etc.), and other external modules such as trusted platform modules and Intelligent Platform Management Interface (IPMI).

In one illustrative embodiment, the orchestrator 204, or other suitable component of the system 200, may then retrieve a vSoC template file from a memory (e.g., implemented in the RHD 202 or implemented via the hardware 201) and utilize a toolchain to generate a corresponding bitstream. The memory may include a plurality of such vSoC templates, with each vSoC template providing a different configuration relative to the other vSoC templates. The orchestrator 204 may select the particular toolchain from a plurality of toolchains that are associated with various different RHD architectures. For example, the RHD 202 may be a plurality of RHD devices that include a first RHD that is compatible with a first toolchain, and a second RHD that is compatible with a second toolchain, with the first and second toolchains being different (see also FIGS. 4 and 5). The orchestrator 204 may therefore select a compatible toolchain based on the target RHD. The orchestrator 204 may then apply the bitstream to the at least one RHD 202 to initiate a vSoC instance consistent with the present disclosure.

In some embodiments, launching a vSoC in this fashion does not reset the RHD 202 or otherwise cause disruption of other existing vSoC instances. For instance, the orchestrator 204 is preferably configured to allow for resetting or suspending of the second vSoC instance 206-2 independent of the first vSoC instance 206-1 such that the first vSoC instance 206-1 remains operational while resetting of the second vSoC instance 206-2, and the second vSoC instance 206-2 remains operational while resetting of the first vSoC instance 206-1. In one example, the orchestrator 204 can avoid the necessity of restarting or rebooting the RHD 202 by partitioning the fabric into blocks that can be hot swapped by the system. This capability can include hot-swapping active states for ongoing transactions and activities.

Figure 3:
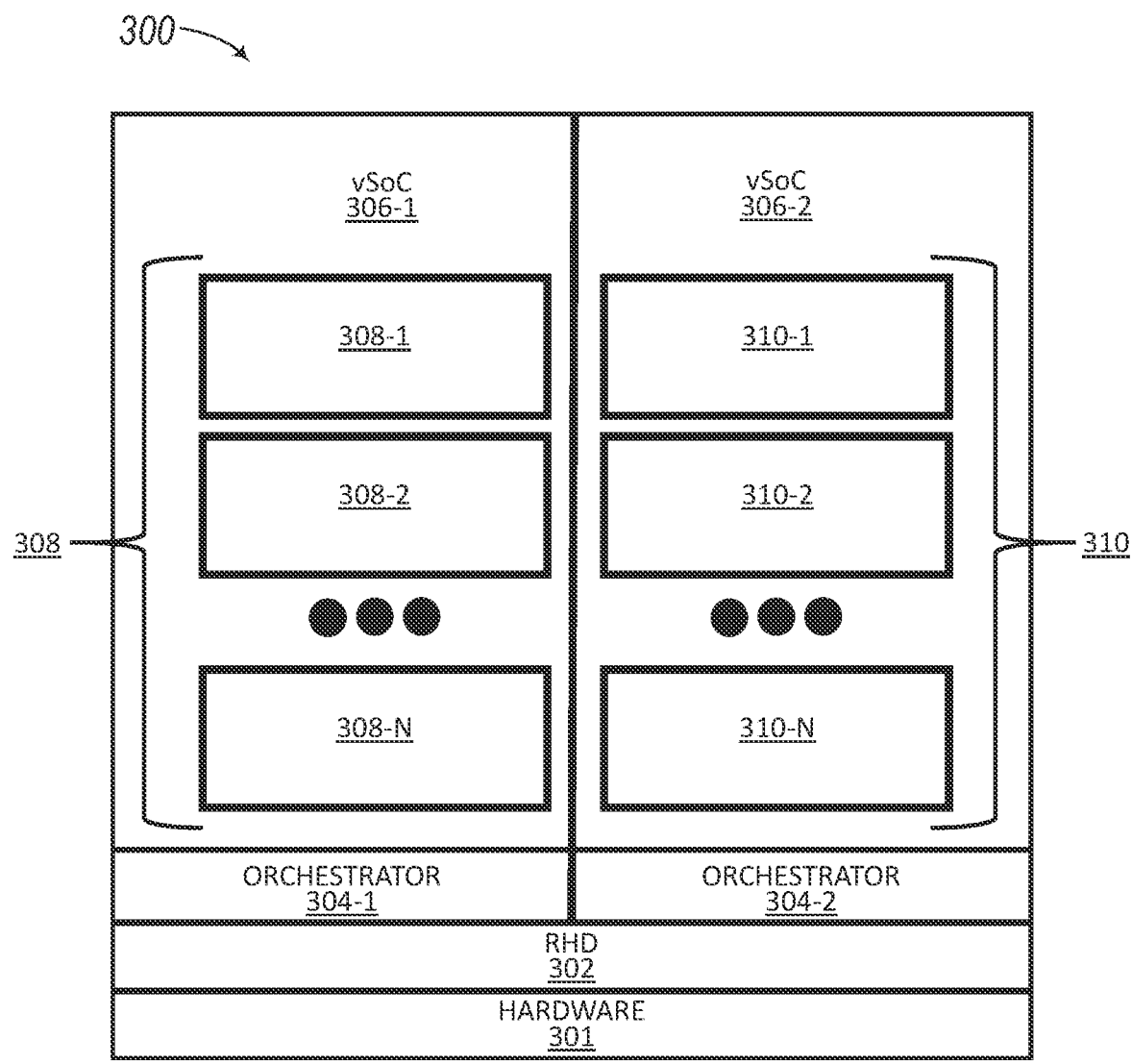
FIG. 3 depicts another example system for providing a plurality of vSoC instances consistent with aspects of the present disclosure.

FIG. 3 shows another example system 300 consistent with aspects of the present disclosure. The example system 300 can be configured substantially similar to that of the example system 100 of FIG. 1 and system 200 of FIG. 2, the features of which are equally applicable to the example system 300 and will not be repeated for brevity. For instance, the hardware 301 can be implemented substantially similar to that of hardware 101 (FIG. 1) and the system 300 utilizes an RHD 302 provided by one or more suitable devices. However, as shown in the example of FIG. 3, the system 300 can include a plurality of orchestrators implemented via RHD 302. For example, the RHD 302 implements first orchestrator 304-1 and second orchestrator 304-2 within programmable fabric of the RHD 302.

The first orchestrator 304-1 further preferably controls execution and virtualization of a first vSoC instance 306-1. The first vSoC instance 306-1 preferably implements a plurality of virtualized system components shown collectively as 308 and individually as 308-1 to 308-N.

Likewise, the second orchestrator 304-2 further preferably controls execution and virtualization of the second vSoC instance 306-2. The second vSoC instance 306-2 preferably implements a plurality of virtualized system components shown collectively as 310 and individually as 310-1 to 310-N.

Figure 4:
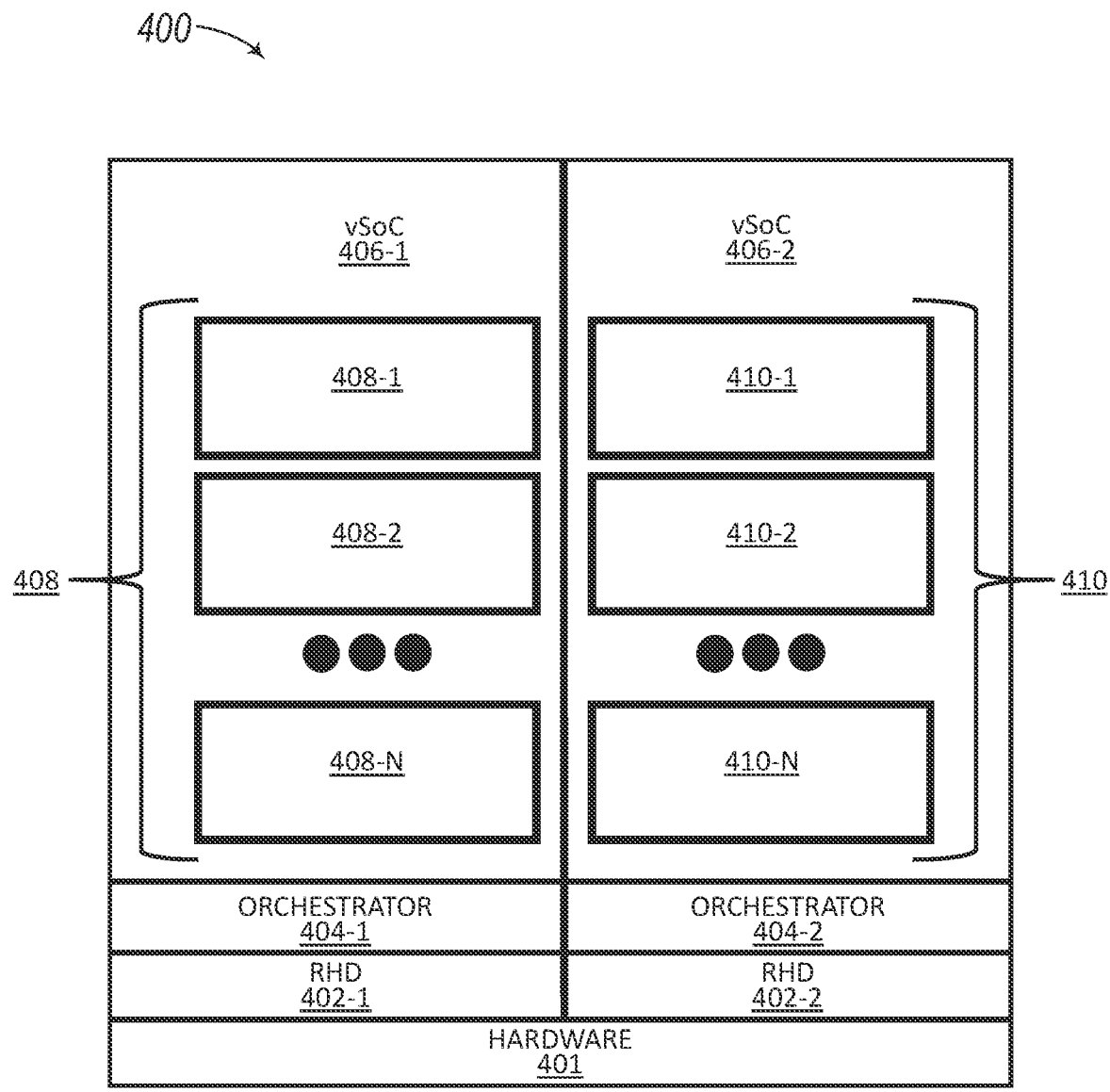
FIG. 4 depicts another example system for providing a plurality of vSoC instances consistent with aspects of the present disclosure.

FIG. 4 shows another example system 400 consistent with aspects of the present disclosure. The example system 400 may be configured substantially similar to the example systems 100-300 of FIGS. 1-3 discussed above, the features of which are equally applicable to the example system 400 and will not be repeated for brevity. However, as shown in the example system 400 of FIG. 4, the hardware 401 implements a plurality of RHD devices, namely at least a first RHD 402-1 and a second RHD 402-2. The first RHD 402-1 preferably implements at least a first orchestrator 404-1. The first orchestrator 404-1 preferably controls execution and virtualization of at least a first vSoC instance 406-1. The first vSoC instance 406-1 further preferably implements a plurality of virtualized system components shown collectively at 408 and individually as 408-1 to 408-N. The second RHD 402-2 preferably implements at least a second orchestrator 404-2, as shown. The second orchestrator 404-2 preferably controls execution and virtualization of at least a second vSoC instance 406-2. The second vSoC instance 406-2 further preferably implements a plurality of virtualized system components shown collectively at 410 and individually as 410-1 to 410-N.

Figure 5:
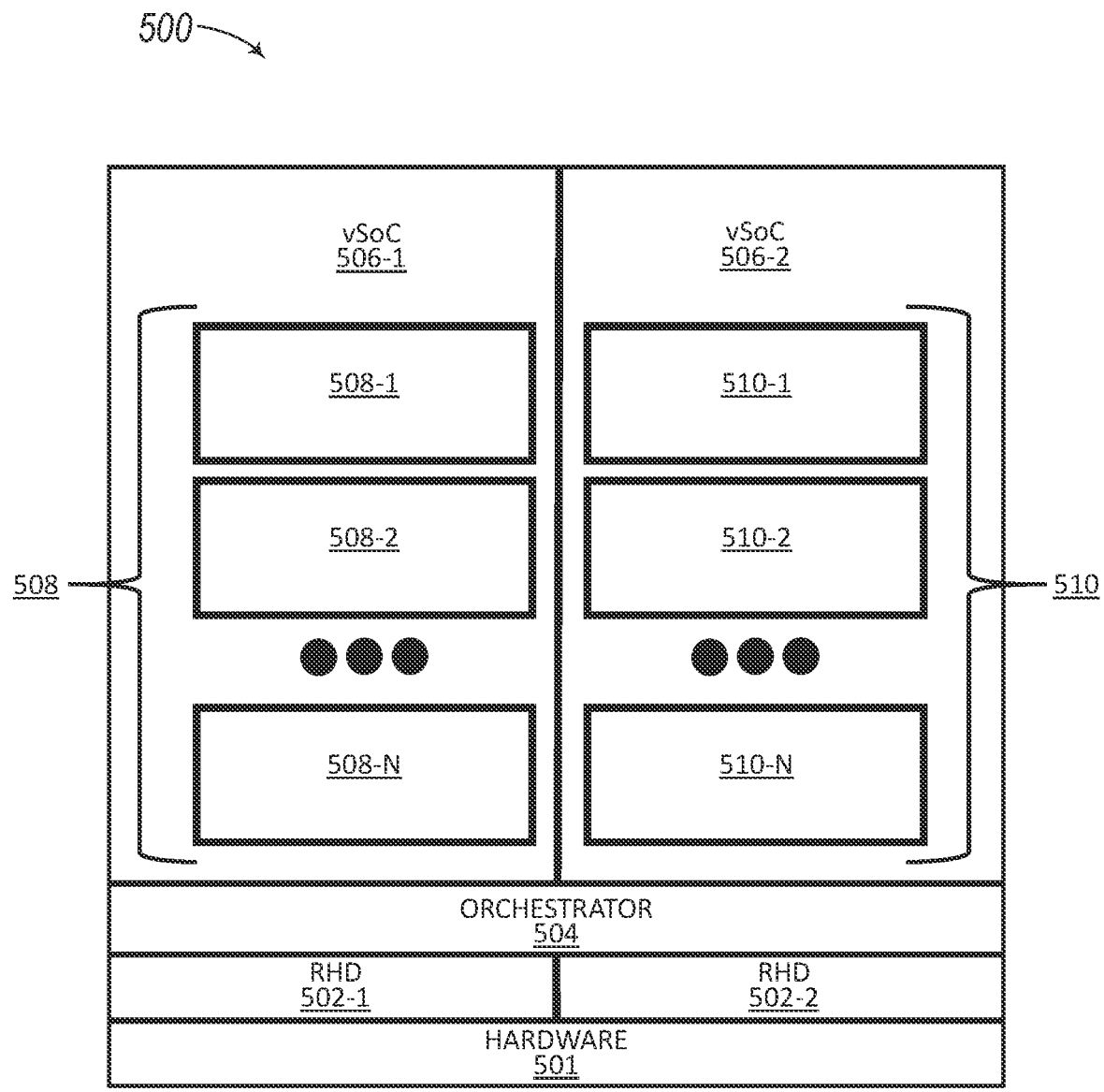
FIG. 5 depicts another example system for providing a plurality of vSoC instances consistent with aspects of the present disclosure.

FIG. 5 shows another example system 500 consistent with aspects of the present disclosure. The example system 500 may be configured substantially similar to the example systems 100-400 of FIGS. 1-4 discussed above, the features of which are equally applicable to the example system 500 and will not be repeated for brevity. However, as shown in the example system 500 of FIG. 5, the hardware 501 implements a plurality of RHD devices, namely at least a first RHD 502-1 and a second RHD 502-2. The first RHD 502-1 and second RHD 502-2 preferably collectively implement at least one orchestrator 504. The at least one orchestrator 504 preferably controls execution and virtualization of at least first and second vSoC instances 506-1, 506-2.

The first vSoC instance 506-1 further preferably implements a plurality of virtualized system components shown collectively at 508 and individually as 508-1 to 508-N. The second vSoC instance 506-2 further preferably implements a plurality of virtualized system components shown collectively at 510 and individually as 510-1 to 510-N.

Figure 6:
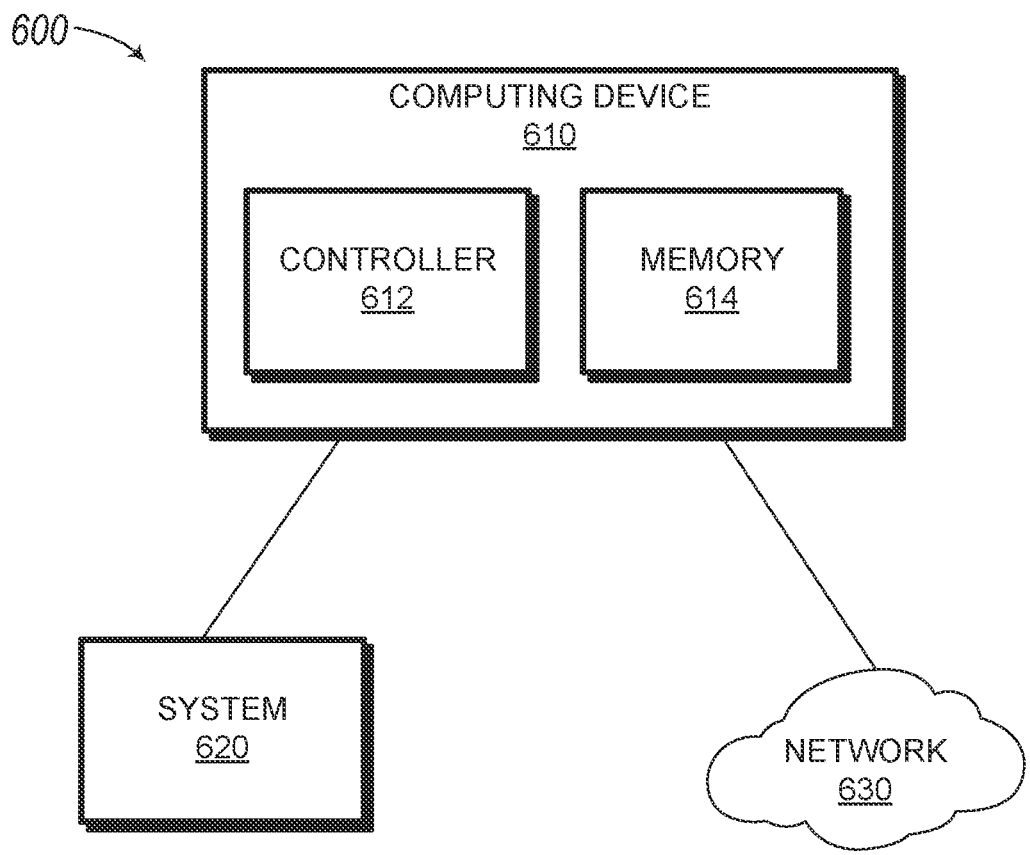
FIG. 6 is a functional block diagram illustrating a system to implement a vSoC instance, in accordance with an embodiment of the present disclosure.

FIG. 6 is a functional block diagram illustrating a distributed data processing environment, generally designated 600, suitable for implementing a vSoC instance, in accordance with an embodiment of the present disclosure. In the illustrative embodiment of FIG. 6, computing device 610 is optionally connected to network 630. Network 630 can be, for example, a telecommunications network, a local area network (LAN), a wide area network (WAN), such as the Internet, a communications bus, such as CAN bus, etc., or a combination of the thereof, and can include wired, wireless, or fiber optic connections. In general, network 630 can be any combination of connections and protocols that will support communications between computing device 610 and other computing devices (not shown) within distributed data processing environment 600.

Computing device 610 can be a standalone computing device, a mobile computing device, or any other electronic device or computing system capable of receiving, sending, and processing data. In another embodiment, computing device 610 can represent a server computing system utilizing multiple computers as a server system, such as in a cloud computing environment. In yet other embodiments, computing device 610 may be a plurality of separate computing devices that are communicatively coupled, e.g., through network 630.

In an embodiment, computing device 610 includes a controller 612. In an embodiment, the controller 612 is circuitry to control system 620. System 620 is an example system, e.g., system 100 from FIG. 1, system 200 from FIG. 2, system 300 from FIG. 3, system 400 from FIG. 4, or system 500 from FIG. 5, for providing at least one vSoC instance consistent with aspects of the present disclosure. In an alternative embodiment, the controller 612 may be located on any other device accessible by computing device 610 via network 630.

In an embodiment, computing device 610 includes memory 614. In an embodiment, memory 614 may be managed by the controller 612. In an alternate embodiment, memory 614 may be managed by an orchestrator, e.g., orchestrator 104 of FIG. 1, or an RHD, e.g., RHD 102 of FIG. 1, or both. Memory 614 may store a plurality of vSoC templates that are used by controller 612, one or more RHDs, or one or more orchestrators, or any combination thereof, to instantiate a specific virtual component in any vSoC of the one or more vSoCs in the system.

FIG. 6 provides only an illustration of one possible implementation and does not imply any limitations with regard to the environments in which different embodiments may be implemented. Many modifications to the depicted environment may be made by those skilled in the art without departing from the scope of the disclosure as recited by the claims.

According to one aspect of the present disclosure, there is thus provided a system for providing virtualized hardware resources. The system includes: one or more reconfigurable hardware devices (RHD) configured to instantiate a first virtual System-on-Chip (vSoC) instance of one or more vSoC instances, the first vSoC instance having at least one virtualized system component.

According to another aspect of the disclosure, there is provided a method for providing virtualized hardware resources implemented via one or more reconfigurable hardware devices (RHDs). The method includes: initiating execution, by a controller, of a first virtual system-on-chip (vSoC) instance of one or more vSoC instances on a first RHD, the first vSoC instance having at least one virtualized system component; and initiating execution, by the controller, of a second vSoC instance of the one or more vSoC instances on the first RHD, the second vSoC instance having at least one virtualized system component, wherein the first vSoC instance and second vSoC instances are concurrently executed on the first RHD.

According to yet another aspect of the disclosure, there is provided an apparatus for providing virtualized hardware resources. The apparatus includes: an underlying physical hardware; one or more reconfigurable hardware devices (RHDs), wherein the one or more RHDs are implemented in the underlying physical hardware; an orchestrator, wherein the orchestrator is configured to initiate virtualization and/or de-virtualization of one or more virtual System-on-Chip (vSoC) instances; and the one or more vSoC instances, wherein each vSoC instance of the one or more vSoC instances has at least one virtualized system component From the foregoing it will be appreciated that, although specific examples have been described herein for purposes of illustration, various modifications may be made without deviating from the spirit and scope of the disclosure described herein. Accordingly, the disclosure is not limited except as by corresponding claims and the elements recited by those claims. In addition, while certain aspects of the disclosure may be presented in certain claim forms at certain times, the inventors contemplate the various aspects of the disclosure in any available claim form. For example, while only some aspects of the disclosure may be recited as being embodied in a computer-readable medium at particular times, other aspects may likewise be so embodied.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system for providing virtualized hardware resources, the system comprising:
    one or more reconfigurable hardware devices (RHD) configured to instantiate a first virtual System-on-Chip (vSoC) instance of one or more vSoC instances, the first vSoC instance implementing at least one virtualized system component, wherein:
    the at least one RHD is further configured to instantiate a second vSoC instance of the one or more vSoC instances having at least one virtualized system component;
    the system further comprises an orchestrator configured to initiate virtualization and/or de-virtualization of the first vSoC instance and the second vSoC instance within a first RHD of the at least one RHD;
    the at least one RHD comprises at least a first RHD and a second RHD, and wherein the orchestrator is configured to instantiate the first vSoC instance on the first RHD and the second vSoC instance on the second RHD;
    the at least one RHD is configured to instantiate the first vSoC instance based on a vSoC template selected from a plurality of vSoC templates stored in a memory, and
    each vSoC template of the plurality of vSoC templates defines at least one virtualized system component for instantiation by the RHD.

2. The system of claim 1, wherein the at least one virtualized system component comprises at least one of a single core processor, a multi-core processor, a cryptographic core, a network interface circuit (NIC), a signal processing circuit, a communication processor, a trusted platform module, an Intelligent Platform Management Interface (IPMI), and/or an application-specific circuit.

3. The system of claim 1, wherein the at least one virtualized system component of the first vSoC instance includes a first plurality of virtualized system components, and the at least one virtualized system component of the second vSoC instance of the one or more vSoC instances includes a second plurality of virtualized system components, wherein the first plurality of virtualized system components is different than the second plurality of virtualized system components.

4. The system of claim 3, wherein the first vSoC instance and the second vSoC instance include identical virtualized system components.

5. The system of claim 1, wherein the first vSoC instance and the second vSoC instance are isolated from each other such that memory associated with the first vSoC instance cannot be accessed by the second vSoC instance, and memory associated with the second vSoC instance cannot be accessed by the first vSoC instance.

6. The system of claim 1, wherein the orchestrator is configured to reset the first vSoC instance and the second vSoC instance independent of each other such that the first vSoC instance remains operational while resetting the second vSoC instance, and the second vSoC instance remains operational while resetting the first vSoC instance.

7. The system of claim 1, wherein the orchestrator is configured to initiate virtualization of a third vSoC instance of the one or more vSoC instances within the first RHD.

8. The system of claim 7, wherein the orchestrator is configured to initiate virtualization and/or de-virtualization of any vSoC instance of the one or more vSoC instances based on a command received from a remote computing device.

9. The system of claim 1, wherein the at least one RHD comprises at least a first RHD and a second RHD, and wherein the orchestrator is configured to clone the first vSoC instance instantiated on the first RHD to the second RHD such that the second vSoC instance is initialized on to the second RHD with one or more virtualized system components identical to that of the first vSoC instance.

10. The system of claim 1, wherein the at least one RHD comprises a plurality of RHDs.

11. The system of claim 10, wherein the plurality of RHDs is implemented via a plurality of networked computer systems.

12. The system of claim 1, wherein a replacement vSoC instance is instantiated to replace an existing vSoC instance.

13. The system of claim 12, wherein the replacement vSoC instance is instantiated to replace the existing vSoC instance based on abnormal behavior of the existing vSoC instance.

14. The system of claim 12, wherein the replacement vSoC instance is instantiated to replace the existing vSoC instance to upgrade the existing vSoC instance to a new version.

15. The system of claim 14, wherein the new version includes one or more new features.

16. The system of claim 12, wherein the replacement vSoC instance is instantiated to replace the existing vSoC instance with a new vSoC instance, and further wherein the new vSoC instance is a different virtual component than the existing vSoC instance.

17. A method for providing virtualized hardware resources implemented via one or more reconfigurable hardware devices (RHDs), the method comprising:
  initiating execution, by a controller, of a first virtual system-on-chip (vSoC) instance of one or more vSoC instances on a first RHD, the first vSoC instance having at least one virtualized system component;
  initiating execution, by the controller, of a second vSoC instance of the one or more vSoC instances on the first RHD, the second vSoC instance having at least one virtualized system component, wherein the first vSoC instance and second vSoC instances are concurrently executed on the first RHD; and
  implementing a first processor architecture on the first RHD and initiating execution of the second vSoC instance further comprises implementing a second processor architecture on the first RHD, the first and second processor architectures being different.

18. The method of claim 17, wherein the method further comprises suspending execution, by the controller, of the first vSoC instance without interrupting execution of the second vSoC instance.

19. The method of claim 17, wherein initiating execution of the second vSoC instance occurs subsequent to initiating execution of the first vSoC instance, and wherein initiating execution of the second vSoC instance occurs while maintaining execution of the first vSoC instance.

20. The method of claim 17, further comprising selecting a vSoC template from a plurality of vSoC templates, and wherein initiating any vSoC of the one or more vSoC instances further comprises the controller programming the first RHD based on the selected vSoC template.

21. The method of claim 17, wherein the at least one virtualized system component of the first vSoC instance is at least one of a single core processor, a multi-core processor, a cryptographic core, a network interface circuit (NIC), a signal processing circuit, and/or an application-specific circuit.

22. The method of claim 17, wherein the at least one virtualized system component of the second vSoC instance is a bug-fixed and/or upgraded version of the at least one virtualized system component of the first vSoC instance.

* * * * *